March 21, 1961     E. M. TISCHER     2,975,901
COMBINED LIQUID MEASURE AND FILTER
Filed Dec. 15, 1958
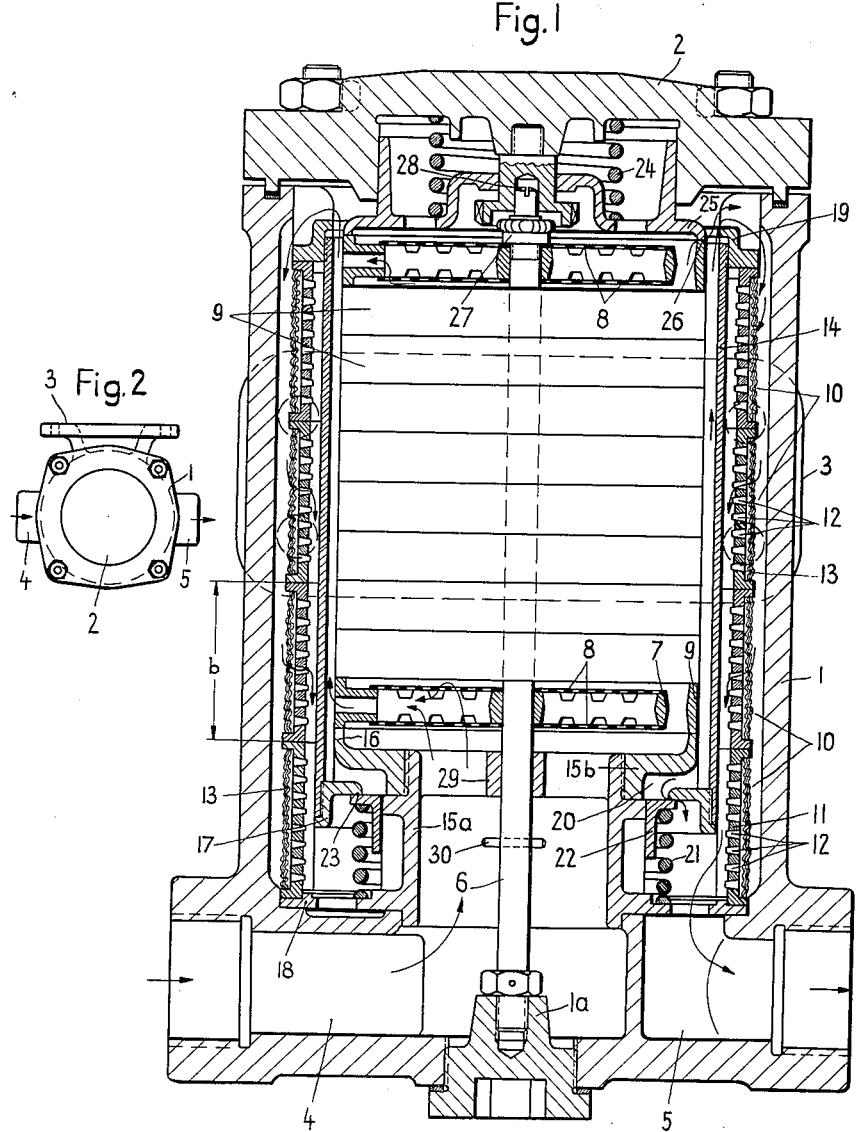
INVENTOR.
ERNST MAX TISCHER

2,975,901
COMBINED LIQUID MEASURE AND FILTER

Ernst Max Tischer, Bei den 7 Kindeln NR. 3, Augsburg, Germany

Filed Dec. 15, 1958, Ser. No. 780,378

6 Claims. (Cl. 210—132)

The invention relates to a combined liquid filter wherein a strainer coil filter (subject of U.S. Pat. 2,769,548) serving as a fine filter follows a filter comprising a number of circular filter elements, both filters being disposed concentrically in a common casing. In a known combined liquid filter of this kind (subject of applicant's prior U.S. Pat. 2,770,368) which is used for many different kinds of filtering, inter alia the filtering of engine lubricating oil coil filters and circular filter elements are disposed axially one after another or one above another. This type of arrangement results in that the combined filter is of excessive overall height. Also, in applicant's prior arrangement the coil filter surface is too small relatively to the circular filters so that the coil filter acting as fine filter rapidly becomes jammed and the combined filter therefore requires frequent dismantling for cleaning.

The present invention relates to a combined liquid filter wherein the strainer coil filter surrounds circular filter elements which are disposed one on top of another to form a cylindrical stack, a cylindrical partition being provided in the annular chamber between the coil filter and the filter stack. This novel design results in a very reduced overall height. Also, a coil filter with a relatively large surface can be provided in the novel arrangement so that filtering is improved and the period of operation increased considerably. The invention enables a very large filter surface to be provided in a very reduced space or in a casing having a reduced overall height. This feature helps to reduce production costs and is important as regards the fitting of such a combined filter in vehicle engines and, for instance, in marine engines.

With the novel design the pressure drop when the liquid or oil is cold is much less than in the constructions known heretofore.

An embodiment of the invention is illustrated in the drawings wherein:

Figure 1 is a vertical sectional view through a combined liquid filter according to the invention, and Figure 2 is a plan view thereof to a reduced scale.

Referring to the drawings, the reference 1 denotes a cylindrical filter casing and the reference 2 denotes the cover thereof. A flange 3 serves to enable the mounting of the casing. The reference 4 denotes the inflow conduit for the liquid to be filtered and the reference 5 denotes the outflow conduit for the filtered liquid. As can be seen in the drawings, circular filter elements 7 are provided threaded onto a pin 6 one above another. Each element 7 has two circular filter strainers 8 and an outer ring 9 with which the elements engage in sealing-tight manner and, as can be seen in the drawings, form a cylindrical stack. This stack is surrounded by a strainer coil filter which, in the embodiment illustrated, comprises a number of coil filters 10 which are disposed one above another and pressed together by screwing or the like, the width $b$ of the filters 10 being much less than the diameter thereof. A drum-shaped filter element 11 is formed with a number of annular flow orifices 12. A straining strip 13 is wound onto the element 11 with relatively great tension and in a number of layers so that the convolutions of the straining strip bear against one another everywhere with uniform surface pressure, thus providing a very fine filtering action. A coil filter of such type is subject of applicant's prior U.S. Pat. 2,769,548.

As can be seen in the drawings, an imperforate cylindrical partition 14 is provided in the annular space between the coil filter 10 and the filter stack 9. The partition 14 is provided to separate the filter chambers from one another and to guide the liquid to be filtered through the initial filter and fine filter in the direction indicated by arrows.

It will be apparent from the drawings that with the novel design a relatively large coil filter surface can be provided for a complete filter of reduced overall height. Advantageously, the gross coil surface filter area is approximately 60–70% of the gross circular filter surface area. It has been found that if this dimensioning is followed, the initial filter and the subsequent fine filter are soiled to approximately the same extent—i.e. the operating period of the two filters is the same.

In the construction illustrated a bearing bush 15a, 15b which is conveniently in two parts is fitted centrally in the casing 1. The liquid flows to the circular filters 7, 8 through the said bush which has three flanges 16, 17 and 18 of different diameters and disposed one above another. The top inner flange 16 serves for the mounting of the parallel filter elements 7 to 9, the central flange 17 serves for the fastening of the cylindrical partition 14, and the bottom flange 18 serves for the mounting of the coil filters 10 which are compressed by means of a nut 19 screwed onto the cylinder 14.

The two-part bearing bush comprises the main part 15a with the bottom flange 18 and a screwed-on bearing ring 15b on which the top flange 16 and central flange 17 are provided. The ring 15b is formed with a flow orifice 20 for the initially filtered liquid, and a valve ring 22 axially displaceable on the main part 15a and urged upwards against the ring 15b by means of a coil spring 21 forms a streamline filter with the ring 15b. When the coil filters 10 become very dirty, the oil pressure increases so that the valve ring 22 is lifted, a fine annular gap 23 being produced which acts as a parallel filter and through which there can flow the oil which cannot flow through the coil filters 10.

Similarly, a gap filter 26 which is also connected in parallel and which operates if the circular filters 8 become too dirty is provided between the circular filter stack 9 and the valve disc 25 which is urged upwards by a coil spring 24.

The extremely compact manner in which the filter elements are arranged in the casing in accordance with the invention would make it difficult to fit and dismantle the elements individually. To this end, according to the invention, all the filter elements are combined to form a unit which can be inserted as a whole or removed as a whole into and out of the casing 1 by means of the pin 6. The circular filters 8, 9 threaded onto the pin 6 are compressed by means of a nut 27 adapted to be screwed onto the pin 6. The pin and projecting above the nut 27 is formed with a slot 28 or the like for screwing out the pin 6. The bearing bush 15a is formed with a hub 29 displaceable on the pin 6 and a stop pin 30 or the like is provided in the bearing pin below the hub 29. After the casing cover 2 has been removed together with the valve disc 25 and after the nut 27 has been slackened, the pin 6 can be screwed out of the casing part 1a with a screw-driver. When the bearing pin is lifted the stop pin 30 abuts the hub 29 so that the complete filter unit 15a, 15b, 7 to 9 and 10 can be lifted out of the casing 1, thus facilitating the task of cleaning the combined filter.

What I claim is:

1. A combined liquid filter comprising a casing having an inlet and an outlet, a plurality of superposed circular filter elements in said casing and communicating with said inlet, a plurality of stacked strainer coil filter elements surrounding said circular filter elements and spaced from said housing, an imperforate cylindrical partition surrounding said circular filter elements and disposed between and spaced from said circular filter elements and said strainer coil filter elements, a passageway at the upper end of said partition communicating the space between said partition and said circular filter elements with the space between said casing and said strainer coil filter elements, said outlet communicating with the space between said partition and said strainer coil filter elements.

2. A combined liquid filter according to claim 1, wherein the widths of said strainer coil filters are considerably less than the diameters thereof.

3. A combined liquid filter according to claim 1, characterized in that the gross strainer coil filter surface area is approximately 60–70% of the gross circular filter area.

4. A combined liquid filter according to claim 1, characterized in that a two part bearing bush is provided centrally of said casing, the liquid flowing to said circular filter elements flowing through said bush, said bush having three flanges disposed one above another and of different diameters, said three flanges including a top inner flange serving for the mounting of said circular filter elements, a central flange serving for the fastening of said cylindrical partition, and a bottom outer flange serving for the mounting of said strainer coil filter elements which are compressed by means of a nut screwed on to said cylindrical partition.

5. A combined liquid filter according to claim 4, characterized in that said bearing bush comprises a main part provided with the bottom flange and a top screwed-on bearing ring provided with a central and top flange, said bearing ring being formed with a flow orifice for the filtered liquid, a valve ring forming a gap filter with said bearing ring said valve ring being axially displaceable on said main part, a coil spring, said valve ring being urged upwards against the bearing ring by said coil spring.

6. A combined liquid filter according to claim 5, further comprising a central bearing pin screwed into said casing, a nut by means of which the circular filters threaded on to the bearing pin are pressed together, said bearing pin including an end projecting above said nut formed with a slot for screwing out the bearing pin, said bearing bush having a hub displaceable on said pin, and a stop pin provided on the bearing pin below said hub so that by means of said bearing pin the complete filter unit can be lifted out of and introduced into the casing.

References Cited in the file of this patent

UNITED STATES PATENTS 2,770,368    Tischer _____ Nov. 13, 1956